US012549815B2

(12) United States Patent
Maity et al.

(10) Patent No.: US 12,549,815 B2
(45) Date of Patent: Feb. 10, 2026

(54) CONTEXT CLASSIFICATION OF STREAMING CONTENT USING MACHINE LEARNING

(71) Applicant: ROKU, INC., San Jose, CA (US)

(72) Inventors: Sayan Maity, Sunnyvale, CA (US); Juhi Checker, Sunnyvale, CA (US); Beth Teresa Logan, Cambridge, MA (US); Erwin Bellers, Fremont, CA (US); Johan Janssen, Morgan Hills, CA (US); Vijay Anand Raghavan, Newton, MA (US); Andrew Lardiere, Orinda, CA (US); Weiming Zhang, San Jose, CA (US)

(73) Assignee: ROKU, INC., San Jose, CA (US)

( * ) Notice: Subject to any disclaimer, the term of this patent is extended or adjusted under 35 U.S.C. 154(b) by 173 days.

(21) Appl. No.: 18/216,894

(22) Filed: Jun. 30, 2023

(65) Prior Publication Data
US 2025/0008188 A1    Jan. 2, 2025

(51) Int. Cl.
H04N 21/466 (2011.01)
H04N 21/439 (2011.01)
H04N 21/488 (2011.01)
H04N 21/81 (2011.01)

(52) U.S. Cl.
CPC ..... H04N 21/4668 (2013.01); H04N 21/4394 (2013.01); H04N 21/4884 (2013.01); H04N 21/812 (2013.01)

(58) Field of Classification Search
None
See application file for complete search history.

(56) References Cited

U.S. PATENT DOCUMENTS

2021/0117685 A1* 4/2021 Sureshkumar ... H04N 21/44016
2022/0222469 A1* 7/2022 Rao ..................... G06V 10/764
2022/0335476 A1* 10/2022 Abdel-Wahab .... G06Q 30/0255

OTHER PUBLICATIONS

Radford, Alec, et al. "*Learning transferable visual models from natural language supervision.*" International Conference on Machine Learning, Jul. 2021, 48 pages.

* cited by examiner

*Primary Examiner* — James R Marandi
(74) *Attorney, Agent, or Firm* — STERNE, KESSLER, GOLDSTEIN & FOX P.L.L.C.

(57) ABSTRACT

Disclosed herein are system, method and/or computer program product embodiments, and/or combinations and sub-combinations thereof, for performing context classification of streaming content using machine learning (ML). In an embodiment, a streaming media client receives an audio/video (A/V) stream that represents a portion of content to be played back by the client. The client reconstructs a sequence of video frames from the A/V stream, extracts audio information from the A/V stream, and executes an ML based classifier to predict a context label associated with the portion of content based at least on one or more video frames from the sequence of video frames and the audio information. The client then transmits the context label to a streaming media service. The service may use the context label to select an advertisement or content recommendation to send to the client or to select a set of content streaming parameters for the client.

20 Claims, 8 Drawing Sheets

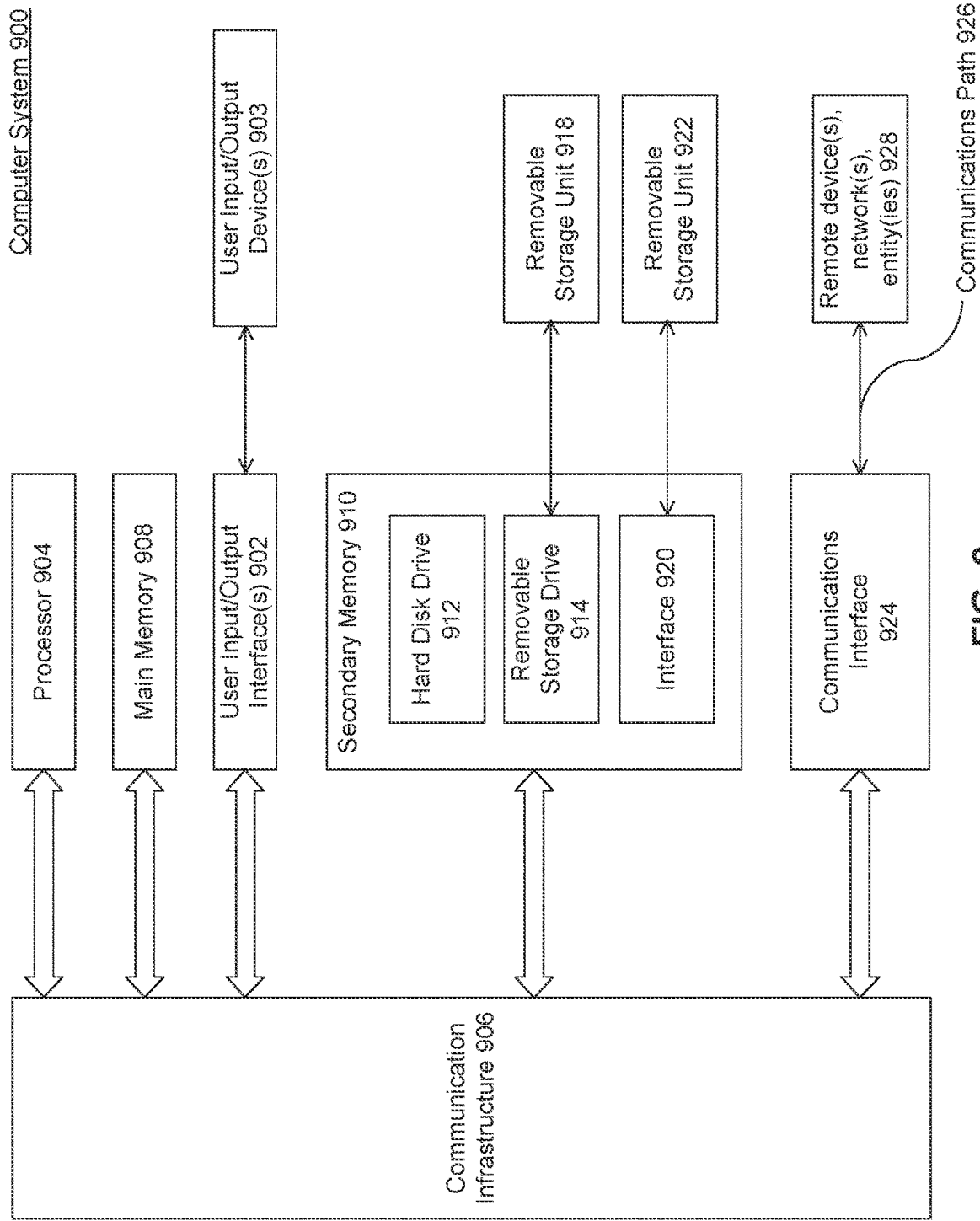

CONTEXT CLASSIFICATION OF STREAMING CONTENT USING MACHINE LEARNING

BACKGROUND

Field

This disclosure is generally directed to techniques for classifying media content being played back by a streaming media device to enable various features including but not limited to targeted advertisement delivery, personalized content recommendations, or account-specific or device-specific tuning of content streaming parameters.

SUMMARY

Provided herein are system, apparatus, article of manufacture, method and/or computer program product embodiments, and/or combinations and sub-combinations thereof, for performing context classification of streaming media content using machine learning (ML). In an embodiment, a streaming media client receives a first portion of an audio/video (A/V) stream that represents a first portion of content to be played back by the streaming media client. The streaming media client reconstructs a sequence of video frames from the first portion of the A/V stream, extracts audio information from the first portion of the A/V stream, and executes an ML based classifier to predict a context label associated with the first portion of the content to be played back by the streaming media client based at least on one or more video frames from the sequence of video frames and the audio information. The streaming media client then transmits the context label to a first streaming media service.

In an embodiment, the streaming media client may receive the first portion of the A/V stream that represents the first portion of the content to be played back by the streaming media client from the first streaming media service or from a second streaming media service.

In another embodiment, the streaming media client receives, from the first streaming media service, an advertisement selected by the first streaming media service based at least on the context label and displays the advertisement.

In yet another embodiment, the streaming media client receives, from the first streaming media service, a content recommendation generated by the first streaming media service based at least on the context label and displays the content recommendation.

In still another embodiment, the streaming media client receives the first portion of the A/V stream that represents the first portion of the content to be played back by the streaming media client from the first streaming media service, and the streaming media client further receives from the first streaming media service a second portion of the A/V stream that represents a second portion of the content to be played back by the streaming media client, wherein the second portion of the A/V stream that represents the second portion of the content to be played back by the streaming media client is generated or transmitted in accordance with a set of content streaming parameters selected by the first streaming media service based at least on the context label, and the streaming media client plays back the second portion of the content based on the second portion of the A/V stream that represents the second portion of the content.

In a further embodiment, the ML based classifier predicts the context label associated with the first portion of the content by selectively assigning a mood from among a plurality of moods to the first portion of the content or by selectively assigning a topic from among a plurality of topics to the first portion of the content.

In a yet further embodiment, the streaming media client selects the one or more video frames from the sequence of video frames by applying a sampling technique. For example, the streaming media client may select the one or more video frames from the sequence of video frames by selecting video frames from the sequence of video frames that exhibit a predetermined degree of feature variance with respect to a preceding video frame in the sequence of video frames.

In a still further embodiment, the streaming media client extracts the audio information from the first portion of the A/V stream by extracting, from the first portion of the A/V stream, one or more of audio signals, subtitle information, or closed caption information.

In another embodiment, the streaming media client executes the ML based classifier to predict the context label associated with the first portion of the content to be played back by the streaming media client by executing a multimodal ML classification model to predict the context label associated with the first portion of the content based at least on the one or more video frames from the sequence of video frames and the audio information.

In yet another embodiment, the streaming media client executes the ML based classifier to predict the context label associated with the first portion of the content to be played back by the streaming media client by executing a first ML classification model that generates a first context label prediction associated with the first portion of the content to be played back by the streaming media client based on the one or more video frames from the sequence of video frames, executing a second ML classification model that generates a second context label prediction associated with the first portion of the content to be played back by the streaming media client based on the audio information, and predicting the context label associated with the first portion of the content to be played back by the streaming media client based at least on the first context label prediction and the second context label prediction.

In still another embodiment, the streaming media client also obtains metadata associated with the content from the first streaming media service and executes the ML based classifier to predict the context label associated with the first portion of the content to be played back by the streaming media client based at least on the one or more video frames from the sequence of video frames, the audio information and the metadata. The metadata associated with the content may include, for example, one of a content tag associated with the content or information extracted by the first streaming media service from an advertisement request sent thereto by the streaming media client during streaming of the content.

BRIEF DESCRIPTION OF THE FIGURES

The accompanying drawings are incorporated herein and form a part of the specification.

FIG. 9 illustrates an example computer system useful for implementing various embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
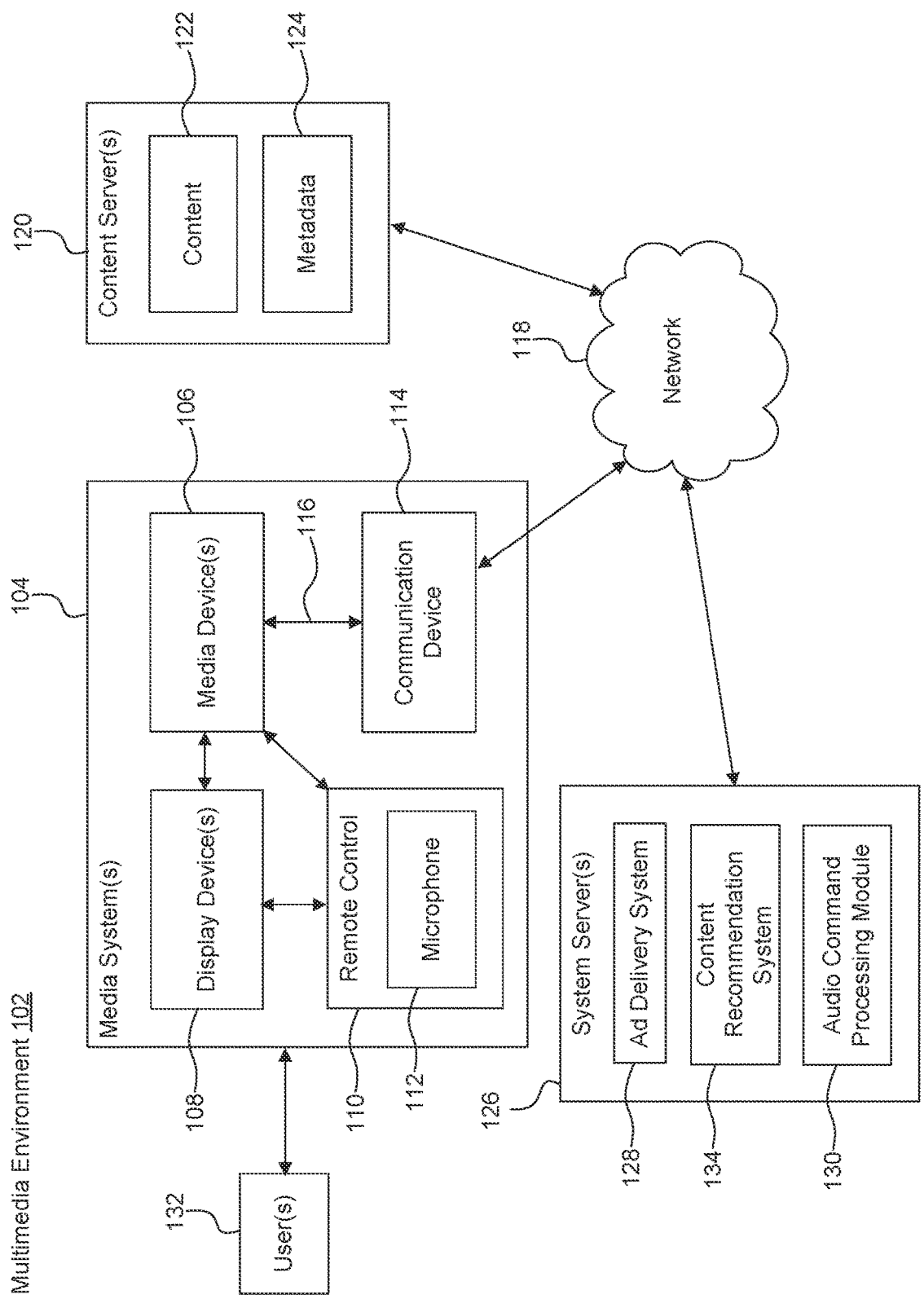
FIG. 1 illustrates a block diagram of a multimedia environment, according to some embodiments.

A variety of streaming media services (also referred to as "over the top" (OTT) services) exist that enable users to view on demand various types of content, including movies, television (TV) shows, sporting events, user-generated videos, and the like. In some cases, a streaming media service may deliver digital advertisements (ads) to its users to support the service, as is the case with certain Advertising-Based Video on Demand (AVOD) and Free Ad-Supported Streaming Television (FAST) offerings. For these types of services, it is desirable to be able to present users with ads that are targeted to their specific traits, interests, or preferences, since such ads are more likely to be relevant to the user and because advertisers will often pay more to deliver such ads.

Streaming media services are also incentivized to present users with content that they are likely to watch, as this can improve the user experience and lead to increased user engagement. Increased user engagement typically equates to increased revenue for the service, regardless of whether the revenue model is ad-based, subscription-based, or transaction-based. To this end, many streaming media services attempt to deliver personalized content recommendations to users. Such personalized content recommendations may be generated, for example, based on user demographic data and/or viewing history information.

To support both targeted advertising and personalized content recommendations, it is helpful if the streaming media service can determine what content a particular user is watching and then leverage that information in selecting ads and content recommendations for that user. However, collecting such information can present a variety of challenges.

For example, some streaming media services provide a platform that enables a user to link to other (e.g., third party) streaming media services for the purposes of streaming content therefrom. In particular, a user of a first streaming media service may access an application corresponding to a second streaming media service via a user interface (UI) of the first streaming media service, and use such application to stream content from the second streaming media service. In such a scenario, the content that is streamed to the user's playback device from the second streaming media service may bypass the servers of the first streaming media service, such that the first streaming media service has no visibility into what the user is watching. Consequently, the first streaming media service cannot leverage information about what the user is watching to support the delivery of targeted ads and personalized content recommendations.

User and data privacy concerns may also arise when contemplating collecting information about what a user is watching. Some users may not be comfortable with the notion that a streaming media service is collecting a list of the content items that they have watched. Furthermore, some governmental bodies have enacted legislation that places rigorous constraints on what type of user information may be collected and under what conditions such data collection may occur.

Furthermore, some systems that collect information about what a user is watching may rely on descriptive information that is tied to a content item as a whole, such as title, genre, content summary, cast members, crew members, or the like. However, a single content item may include within it any number of scenes, topics, themes, moods, or other features or characteristics that change during the viewing thereof. For example, a movie may include a scene that evokes fear followed by a romantic scene. As another example, a news magazine program may include a segment about a human rights issue followed by an interview with a comedian. These more granular and shifting features or characteristics of the content item are typically not captured in the content metadata and thus cannot be leveraged for performing targeted ad delivery or generating personalized content recommendations.

Embodiments described herein may address some or all of the foregoing issues relating to collecting and utilizing information about content a user watches via a streaming media service. For example, in embodiments, a machine learning (ML) based classifier is utilized to analyze portions of content being played back by a streaming media client to predict a context label for each portion of the content. The context labels generated by the ML based classifier may then be used by a streaming media service, for example, to select targeted ads or personalized content recommendations for delivery to the streaming media client.

Since different context labels may be predicted for different portions of the same item of content (e.g., the same movie, TV show, or sporting event), embodiments enable the streaming media service to obtain descriptive information about what a user is watching at a level that is more granular than the content item level. This can, in turn, enable the streaming media service to deliver ads to a user that are tied to a particular scene, topic, theme, mood, or other feature or characteristic of a portion of content that the viewer recently watched. For example, an ad with amusing elements may be delivered to a user that has just finished watching a comedic portion of a movie, even though the movie itself is assigned to the drama genre. Likewise, this feature can enable the streaming media service to deliver content recommendations to a user that relate to features or characteristics of individual portions of content that they have recently or previously watched.

In embodiments, the ML based classifier may be implemented on a streaming media client rather than by a streaming media service. For example, a streaming media client may receive a portion of an A/V stream that represents a portion of content to be played back by the streaming media client, reconstruct a sequence of video frames from the portion of the A/V stream, extract audio information from the portion of the A/V stream, and then execute the ML based classifier to predict a context label associated with the portion of the content based at least on one or more video frames from the sequence of video frames and the audio information. Since these operations may be performed by the streaming media client, they can be applied to any content being played back by the streaming media client, regardless of which streaming media service is supplying the content. Thus, this feature enables a first streaming media service to obtain context labels about content being streamed to the streaming media client by a second (e.g., different) streaming media service, and utilize such context labels to deliver targeted ads and/or personalized content recommendations to the streaming media client.

In further accordance with embodiments in which the context labels are generated by the streaming media client, the context labels may be the only information about the content the user is watching that is provided by the streaming media client to a streaming media service. This can enable a streaming media service to obtain descriptive information about portions of content a user has watched without collecting any identifiers of the content itself. This feature can thus protect user privacy. This feature may also enable a first streaming media service to collect information about content being streamed through its platform by a second streaming media service in a manner that avoids violating an agreement between the two services.

In embodiments, a distributed set of streaming media clients are configured to apply the context classification function to content being played back respectively thereby and to transmit corresponding context labels to a streaming media service. By utilizing the streaming media clients to perform the context classification function rather than the servers used to implement the streaming media service, such embodiments are able to reduce a processing burden that would otherwise be placed on the servers used to implement the streaming media service.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

Multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. Communication device 114 may include, for example, a cable modem or satellite TV transceiver. Media device 106 may communicate with communication device 114 over a link 116, wherein link 116 may include wireless (such as Wi-Fi) and/or wired connections.

In various embodiments, network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. Remote control 110 can be any component, part, apparatus and/or method for controlling media device 106 and/or display device 108, such as a remote control, a tablet, laptop computer, smartphone, wearable, on-screen controls, integrated control buttons, audio controls, or any combination thereof, to name just a few examples. In an embodiment, remote control 110 wirelessly communicates with media device 106 and/or display device 108 using cellular, Bluetooth, infrared, etc., or any combination thereof. Remote control 110 may include a microphone 112, which is further described below.

Multimedia environment 102 may include a plurality of content servers 120 (also called content providers, channels or sources 120). Although only one content server 120 is shown in FIG. 1, in practice multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to content 122. Metadata 124 may also or alternatively include links to any such information pertaining or relating to content 122. Metadata 124 may also or alternatively include one or more indexes of content 122.

Multimedia environment 102 may include one or more system servers 126. System servers 126 may operate to support media devices 106 from the cloud. It is noted that the structural and functional aspects of system servers 126 may wholly or partially exist in the same or different ones of system servers 126.

System servers 126 may include an ad delivery system 128. Ad delivery system 128 may be configured to select and transmit digital advertisements to media device 106 over network 118. Media device 106 may be configured to present such digital advertisements to user 132 (e.g., via display device 108). Ad delivery system 128 may select digital advertisements for delivery to media device 106 based at least on context labels periodically or intermittently generated by media device 106 and transmitted to ad delivery system 128, wherein each context label describes a corresponding portion of content that was played back or is currently being played back by media device 106. For example, ad delivery system 128 may be configured to select an advertisement for delivery to media device 106 based on a context label that describes a portion of content recently (e.g., most recently) played back by media device 106. The generation of context labels by media device 106 and the use of such context labels by ad delivery system 128 to deliver targeted ads to media device 106 will be described in more detail herein.

System servers 126 may include a content recommendation system 134. Content recommendation system 134 may be configured to generate and transmit personalized content recommendations to media device 106 over network 118. Media device 106 may be configured to present such personalized content recommendations to user 132 (e.g., via display device 108). Content recommendation system 134 may generate the personalized content recommendations based at least on the aforementioned context labels that are periodically or intermittently generated by media device 106. For example, such context labels may transmitted to system server(s) 126 and incorporated into a device profile associated with media device 106 or an account profile associated with user 132. Content recommendation system 134 may then use such device or account profile (including the context labels or information derived therefrom) as a basis for generating personalized content recommendations to be sent to media device 106. The generation of context labels by media device 106 and the use of such context labels by content recommendation system 134 to deliver personalized content recommendations to media device 106 will be described in more detail herein.

System servers 126 may also include an audio command processing module 130. As noted above, remote control 110 may include microphone 112. Microphone 112 may receive audio data from users 132 (as well as other sources, such as the display device 108). In some embodiments, media device 106 may be audio responsive, and the audio data may represent verbal commands from user 132 to control media device 106 as well as other components in media system 104, such as display device 108.

In some embodiments, the audio data received by microphone 112 in remote control 110 is transferred to media device 106, which then forwards the audio data to audio command processing module 130 in system servers 126. Audio command processing module 130 may operate to process and analyze the received audio data to recognize a verbal command of user 132. Audio command processing module 130 may then forward the verbal command back to media device 106 for processing.

Figure 2:
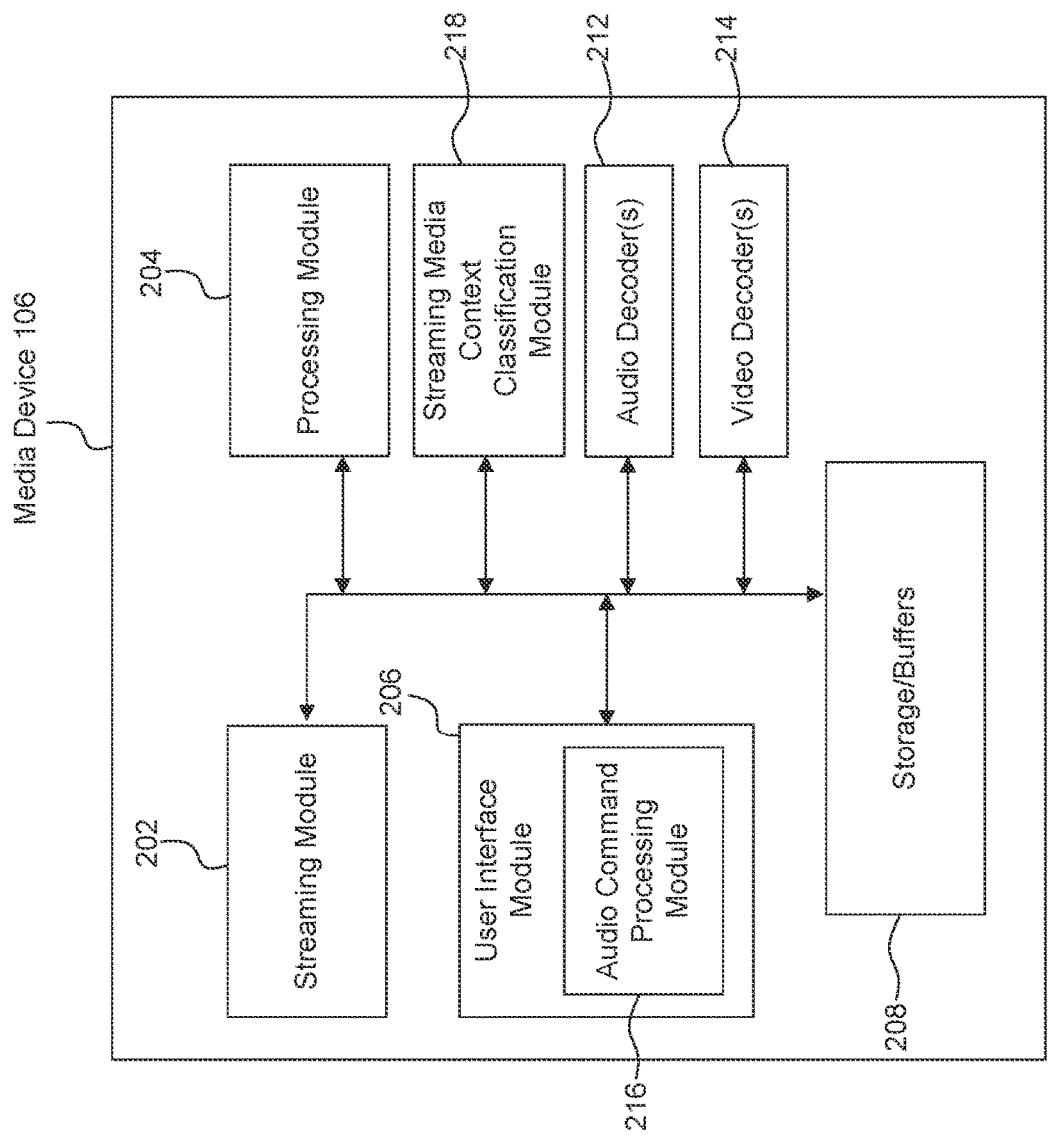
FIG. 2 illustrates a block diagram of a streaming media device, according to some embodiments.

In some embodiments, the audio data may be alternatively or additionally processed and analyzed by an audio command processing module 216 in media device 106 (see FIG. 2). Media device 106 and system servers 126 may then cooperate to pick one of the verbal commands to process (either the verbal command recognized by audio command processing module 130 in system servers 126, or the verbal command recognized by audio command processing module 216 in media device 106).

FIG. 2 illustrates a block diagram of an example media device 106, according to some embodiments. Media device 106 may include a streaming module 202, a processing module 204, storage/buffers 208, a user interface module 206, and a streaming media context classification module 218. As described above, user interface module 206 may include audio command processing module 216.

Media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, user 132 may interact with media device 106 via, for example, remote control 110. For example, user 132 may use remote control 110 to interact with user interface module 206 of media device 106 to select a content item, such as a movie, TV show, music, book, application, game, etc. In response to the user selection, streaming module 202 of media device 106 may request the selected content item from content server(s) 120 over network 118. Content server(s) 120 may transmit the requested content item to streaming module 202. Media device 106 may transmit the received content item to display device 108 for playback to user 132.

In streaming embodiments, streaming module 202 may transmit the content item to display device 108 in real time or near real time as it receives such content item from content server(s) 120. In non-streaming embodiments, media device 106 may store the content item received from content server(s) 120 in storage/buffers 208 for later playback on display device 108.

Context Classification of Streaming Content Using Machine Learning

As further shown in FIG. 2, media device 106 may include a streaming media context classification module 218. Streaming media context classification module 218 may be configured to analyze portions of content being played back by media device 106 to predict a context label for each portion of the content. As will be discussed herein, streaming media context classification module 218 may include a machine learning (ML) based classifier that predicts a context label for each portion of the content being played back by media device 106 based at least on video frames and audio information corresponding to the relevant portion of the content. The context labels generated by media context classification module 218 may then be transmitted to a streaming media service (e.g., a streaming media service implemented using system server(s) 126) so that the streaming media service may select targeted ads or personalized content recommendations for delivery to media device 106.

Figure 3:
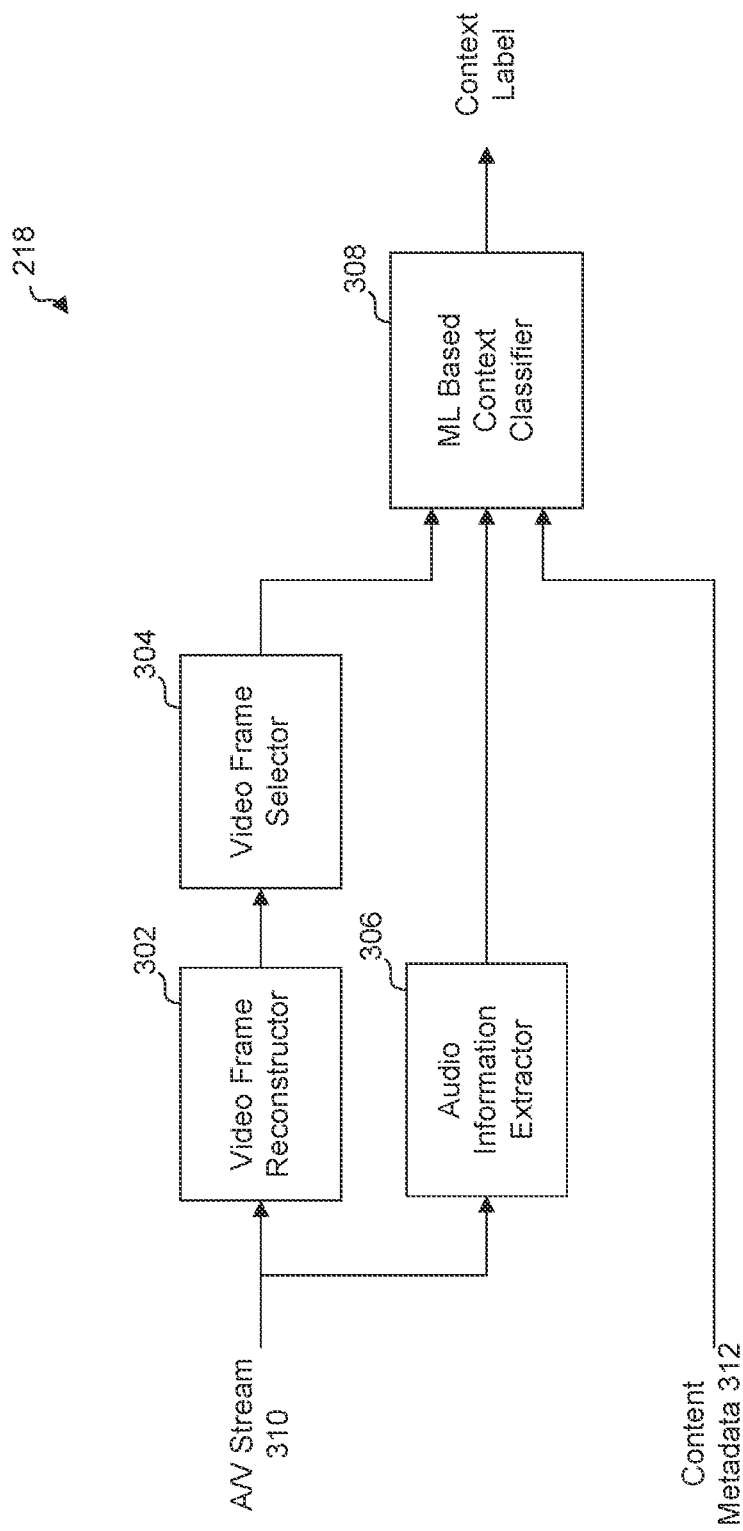
FIG. 3 illustrates a block diagram of a streaming media context classification module, according to some embodiments.

FIG. 3 illustrates a block diagram of streaming media context classification module 218, according to some embodiments. As shown in FIG. 3, streaming media context classification module 218 may comprise a video frame reconstructor 302, a video frame selector 304, an audio information extractor 306, and an ML based context classifier 308. Each of these components may be implemented by processing logic that can comprise hardware (e.g., circuitry, dedicated logic, programmable logic, microcode, etc.), software (e.g., instructions executing on a processing device), or a combination thereof. Each of these components will now be described.

During playback of an item of content (e.g, a movie, TV show, sporting event, user-generated video or the like), media device 106 may receive an audio/video (A/V) stream 310 that represents the item of content and operate to transform A/V stream 310 into audio and video content that is played back for user 132. A/V stream 310 may comprise, for example, a series of packets that carry encoded audio and video information associated with the item of content. A/V stream 310 may be transmitted to media device 106, for example, from content server(s) 120.

Video frame reconstructor 302 may be configured to continuously receive portions of A/V stream 310 and to reconstruct each such portion into a corresponding sequence of video frames. Such reconstruction may entail, for example, decoding encoded video information included in A/V stream 310. Video frame reconstructor 302 may temporarily store reconstructed video frames in storage/buffers 208 of media device 106.

Video frame selector 304 may be configured to select a subset of the sequence of reconstructed video frames associated with each portion of A/V stream 310 so that such subset may be provided to ML based context classifier 308. For example, video frame selector 304 may be configured to apply a sampling technique to select one or more video frames from the sequence of reconstructed video frames associated with each portion of A/V stream 310 for providing to ML based context classifier 308. It may be deemed desirable to provide only a subset of each sequence of video frames to ML based context classifier 308 to reduce storage and/or processing requirements of media device 106.

The sampling technique applied by video frame selector 304 may be a simple sampling technique that selects every n-th frame from the sequence of video frames. However, the sampling technique may also be more complex. For example, the sampling technique may select only video frames from the sequence of video frames that exhibit a predetermined degree of feature variance with respect to a preceding video frame in the sequence of video frames. In accordance with such an approach, if a video frame is not deemed sufficiently different from a preceding video frame with respect to one or more video frame features, then such video frame will not be selected to be provided to ML based context classifier 308. Still other sampling techniques may be used to select one or more video frames from the sequence of video frames to provide to ML based context classifier 308. In alternate embodiments, video frame selector 304 may not be present and all of the video frames in the sequence of video frames associated with a portion of A/V stream 310 may be provided to ML based context classifier 308.

The reconstructed video frames generated by video frame reconstructor 302 for each portion of A/V stream 310 may also be rendered to a display device (e.g., display device 108) as part of playing back a corresponding portion of the item of content. Media device 106 may further include image enhancement logic that selectively modifies certain features of the video frames prior to rendering them to the display device to provide an improved viewing experience. Such image enhancement logic may utilize an ML model to classify each video frame into one of a plurality of different scene types and may select the image optimizations for a given video frame based on the scene type determined for that video frame.

In alternative implementations, the reconstructed video frames generated by video frame reconstructor 302 for each portion of A/V stream 310 may be used for context label prediction but not for playback. In such alternative implementations, media device 106 may also pass A/V stream 310 to another module or device which may operate to transform A/V stream 310 into audio and video content that is played back for user 132.

Audio information extractor 306 may be configured to continuously receive portions of A/V stream 310 and to extract audio information from each such portion. The audio information extracted from each portion of A/V stream 310 may include, for example, one or more of audio signals, subtitle information, or closed caption information associated with a corresponding portion of the content item represented by A/V stream 310. Such extraction of audio information may entail, for example, decoding encoded audio information included in A/V stream 310. Audio information extractor 306 may temporarily store extracted audio information in storage/buffers 208 of media device 106. Audio information extractor 306 may convert certain extracted audio information (e.g., audio signals) into text to facilitate the operation of ML based context classifier 308. In certain implementations, audio information extractor 306 may utilize a language model, such as a Large Language Model, to generate a text summary of one or more of the aforementioned audio signals, subtitle information, or closed caption information and such text summary may be provided to ML based context classifier 308 as audio information used for context label prediction.

Audio information extracted by audio information extractor 306 from each portion of A/V stream 310 may also be used to play back a corresponding portion of the item of content to user 132. For example, audio signals extracted from A/V stream 310 may be converted into audio content by one or more speakers connected to media device 106, while subtitle information or closed caption information extracted from A/V stream 310 may be used to display subtitles or closed captions, respectively, to a display device (e.g., display device 108).

In alternative implementations, the audio information extracted by audio information extractor 306 from each portion of A/V stream 310 may be used for context label prediction but not for playback. In such alternative implementations, media device 106 may also pass A/V stream 310 to another module or device which may operate to transform A/V stream 310 into audio and video content that is played back for user 132.

ML based context classifier 308 may thus be configured to receive, for each portion of A/V stream 310 received by media device 106; (a) one or more video frames selected by video frame selector 304 from among a sequence of video frames reconstructed from the portion of A/V stream 310 by video frame reconstructor 302; and (b) audio information extracted from the portion of A/V stream 310 by audio information extractor 306. Based on at least this information, ML based context classifier may be configured to predict a context label for a portion of the content item represented by the portion of A/V stream 310.

ML based context classifier 308 may be configured to predict a context label for consecutive portions of a content item, wherein each portion has a fixed duration (e.g., 10 minute content portions, 15 minute content portions, or the like). The size or duration of the portions of the content item for which context labels will be generated may be a fixed or configurable parameter of streaming media context classification module 218. In embodiments in which the context labels are used to support targeted ad delivery, the size or duration of the portions of the content item for which context labels will be generated may be selected to align with the size or duration of a viewing window that is situated between ad insertion points in the item of content.

ML based context classifier 308 may be trained to predict a context label for each portion of a content item in accordance with a particular classification scheme. For example, ML based context classifier 308 may be configured to predict the context label for a portion of content by selectively assigning a mood from among a plurality of different moods (e.g., happy, sad, amused, romantic, frightened, motivated, peaceful, hungry, adventurous) to the portion of content. As another example, ML based context classifier 308 may be configured to predict the context label for a portion of content by selectively assigning a topic from among a plurality of topics to the portion of content, wherein each topic may specify a particular subject matter domain to which to a portion of content may pertain. However, these are only examples and ML based context classifier 308 may be trained to predict a context label for each portion of a content item in accordance with a wide variety of other classification schemes.

ML based context classifier 308 may comprise a multimodal visual and language ML classification model that is trained to predict a context label associated with each portion of a content item based on one or more video frames selected by video frame selector 304 and a text representation of audio information provided by audio information extractor 306. For example, the multi-modal visual and language classification model may be a model based on or derived from the Contrastive Language-Image Pre-Training (CLIP) model, as described in A. Radford, et al., "Learning Transferable Visual Models from Natural Language Supervision", ICML 2021, pp. 8748-8763. In accordance with such an implementation, ML based context classifier 308 may comprise a neural network trained on a variety of image and text pairs to predict a context label based on the aforementioned video frames and a text representation of the aforementioned audio information.

ML based context classifier 308 may alternatively comprise a plurality of ML classification models. For example, ML based context classifier 308 may comprise a visual ML classification model that is trained to generate a first context label prediction for a portion of a content item based on one or more video frames selected by video frame selector 304 as well as a language ML classification model that is trained to generate a second context label prediction for the same portion of the content item based on a text representation of audio information extracted by audio information extractor 306. In further accordance with such an implementation, ML based context classifier 308 may predict the context label associated with the portion of the content item based at least on the first context label prediction and the second context label prediction. For example, the visual ML classification model may output a first probability distribution associated with a plurality of different contexts to which the portion of the content item may be assigned, the language ML classification model may output a second probability distribution associated with a plurality of different contexts to which the portion of the content item may be assigned, and ML based context classifier 308 may utilize (e.g., combine) both probability distributions to predict the context label for the portion of the content item.

As shown in FIG. 3, ML based context classifier 308 may also be configured to receive content metadata 312. Content metadata 312 may comprise information about the content item represented by A/V stream 310. For example, content metadata 312 may specify a title, genre, content summary, or other content item level information about the content item represented by A/V stream 310. Content metadata 312 may be transmitted to media device 106 by a streaming media service (e.g., a streaming media service implemented using system server(s) 126). Whether the streaming media service transmits content metadata 312 to media device 106 may depend upon whether such content metadata 312 is available to the streaming media service for the content item represented by A/V stream 310. In scenarios in which content metadata 312 for the content item is provided to media device 106, ML based context classifier 308 may utilize content metadata 312, along with one or more video frames selected by video frame selector 304 and audio information extracted by audio information extractor 306, to predict a context label for a portion of the content item. However, in scenarios in which content metadata 312 for the content item is not provided to media device 106, ML based context classifier 308 may nevertheless predict a context label for a portion of the content item based only on one or more video frames selected by video frame selector 304 and audio information extracted by audio information extractor 306. Furthermore, in alternate implementations, content metadata 312 may never be provided to media device 106 by design, and in such implementations, ML based context classifier 308 may predict a context label for a portion of the content item based only on one or more video frames selected by video frame selector 304 and audio information extracted by audio information extractor 306.

As will be discussed in more detail herein, if the streaming media service that provides content metadata 312 is the same streaming media service that provides A/V stream 310, then content metadata 312 may comprise metadata about the content item corresponding to A/V stream 310 that is maintained by the streaming media service. However, if the streaming media service that provides content metadata 312 is a first streaming media service and the streaming media service that provides A/V stream 310 is a second (different) streaming media service, then content metadata 312 may comprise information extracted by the first streaming media service from an advertisement request sent thereto by media device 106 during streaming of the content.

Figure 4:
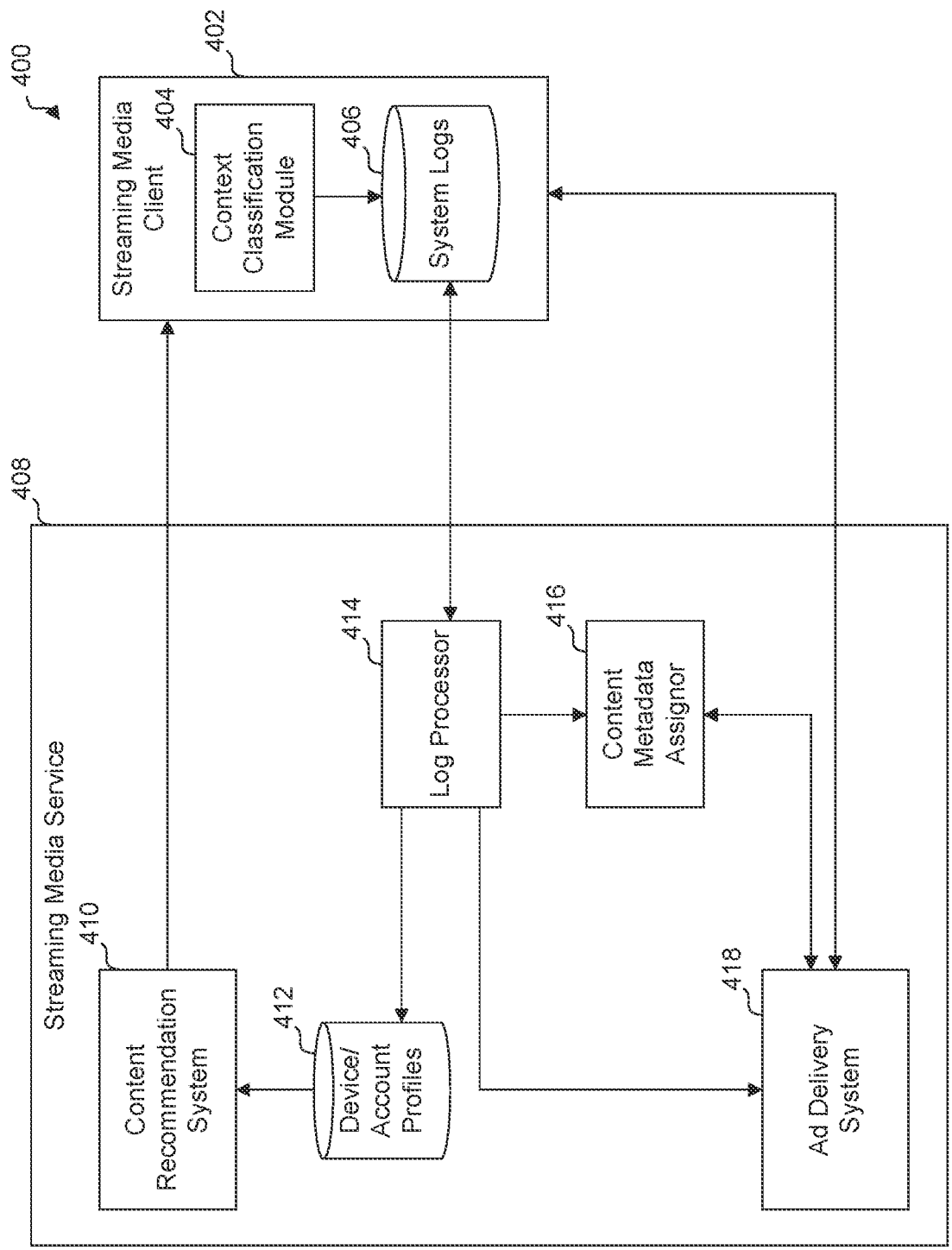
FIG. 4 illustrates a block diagram of a streaming media system in which context labels generated by a streaming media client are used to deliver targeted advertising and/or personalized content recommendations.

FIG. 4 illustrates a block diagram of a streaming media system 400 in which context labels generated by a streaming media client are used to deliver targeted advertising and/or personalized content recommendations. As shown in FIG. 4, streaming media system 400 includes a streaming media client 402 and a streaming media service 408.

Streaming media client 402 may represent media device 106 as previously described in reference to FIGS. 2 and 3. However, streaming media client 402 may generally represent any device that receives an A/V stream that represents content to be played back to a user. For example, streaming media client 402 may comprise a streaming media stick or dongle, a smart television, a set top box, a personal computer (e.g., tablet, laptop computer, desktop computer), a smart phone, a video game console, a wearable computer, or the like. Streaming media client 402 may operate to play back the content it receives or may pass the content to another device to facilitate playback thereof. One or more components of streaming media client 402 may be implemented by processing logic that can comprise hardware (e.g., circuitry, dedicated logic, programmable logic, microcode, etc), software (e.g., instructions executing on a processing device), or a combination thereof.

As shown in FIG. 4, streaming media client 402 includes a context classification module 404. Context classification module 404 may be implemented in a like manner to content classification module 218 as described above in reference to FIGS. 2 and 3, and may operate in a like fashion to periodically or intermittently generate context labels for respective portions of an item of content being played back by streaming media client 402. The context labels that are generated by context classification module 404 may be stored in system logs 406 within streaming media client 402. Such system logs 406 may be stored, for example, in one or more volatile or non-volatile memory devices within streaming media client 402.

Streaming media service 408 represents a computer-implemented service that enables streaming media client 402 to browse various items of content (e.g., movies, TV shows, sporting events, user-created videos) and to initiate streaming of a selected content item to streaming media client 402 for playback thereby. Streaming media service 408 may include, for example, system server(s) 126 and content server(s) 120 as described above in reference to FIG. 1. Streaming media service 408 may comprise servers that stream a selected content item to streaming media client 402. However, streaming media service 408 may also enable streaming media client 402 to access a second (e.g., third party) streaming media service and initiate the streaming of content therefrom. In this case, the second streaming media service may stream the content directly to streaming media client 402 and such content may not pass through servers of streaming media service 408.

As shown in FIG. 4, streaming media service 408 includes a log processor 414, a content metadata assignor 416, an ad delivery system 418, a device/account profiles data store 412, and a content recommendation system 410. Each of these components of streaming media service 408 may be implemented by processing logic that can comprise hardware (e.g., circuitry, dedicated logic, programmable logic, microcode, etc.), software (e.g., instructions executing on a processing device), or a combination thereof. Each of these components of streaming media service 408 will now be described.

Log processor 414 may be configured to periodically or intermittently obtain from streaming media client 402 information from system logs 406, including context labels generated by context classification module 404. Depending upon the implementation, log processor 414 may be configured to periodically or intermittently poll streaming media client 402 for such information, or streaming media client 402 may be configured to periodically or intermittently push such information to streaming media service 408. Each context label obtained from streaming media client 404 may be accompanied by additional information, such as an identifier of streaming media client 402, an identifier of an account or user associated with streaming media client 402, and/or a timestamp indicating when or for what period of time the context label was generated.

Log processor 414 may be further configured to provide the context labels and associated information that it receives from streaming media client 402 to ad delivery system 418. Ad delivery system 418 may represent ad delivery system 128 as previously described in reference to FIG. 1. However, ad delivery system 418 may generally represent any system that is configured to select and deliver ads on demand to a streaming media client.

Ad delivery system 418 may be configured to use the context labels and associated information received from log processor 414 to select ads for delivery to streaming media client 402. For example, log processor 414 may provide a context label that was received from streaming media client 402 to ad delivery system 418 and ad delivery system 418 may use such context label to select one or more ads to be transmitted to streaming media client 402 to be presented during one or more upcoming ad time slots. The timing of this process may be managed such that the ads that are delivered to streaming media client 402 are selected based on the context label associated with a portion of content that streaming media client 402 has just played back.

The foregoing feature of streaming media system 400 thus enables ad delivery system 418 to deliver ads to streaming media client 402 that are deemed appropriate, effective or otherwise desirable in view of the portion of content that the user just watched. Thus, for example, ads may be selected based on a particular mood, topic, theme or scene associated with a portion of content that a user just watched. As a further example, portions of content may be labeled in a fashion that indicates their suitability for certain audiences (e.g., they may be labeled using the Motion Picture Association film rating system or some other system that denotes the appropriateness of content for children or other audiences). Such labels may be used, for example, by advertisers that bid for ads delivered by ad delivery system 418 to ensure that their advertisements do not appear in conjunction with inappropriate or offensive content.

Content metadata assignor 416 may also provide content metadata associated with the item of content being played back by streaming media client 402 to ad delivery system 418 and ad delivery system 418 may use such information, along with a context label collected by log processor 414, to select one or more ads for delivery to streaming media client 402. Such content metadata may specify, for example, a title, genre, content summary, or other content item level information about the content item currently being played back by streaming media client 402.

In scenarios in which streaming media service 408 is the service that is streaming the item of content to streaming media client 402 for playback thereby, streaming media service 408 may maintain such content metadata in a data store that is included in or otherwise accessible to streaming media service 408 and content metadata assignor 416 may retrieve such content metadata from the data store. The content metadata maintained by streaming media service 408 may comprise, for example, a content tag associated with the item of content.

However, if the streaming media service that is streaming the item of content to streaming media client 402 for playback thereby is not streaming media service 408 (e.g., it is a different streaming media service, such as a third-party streaming media service), then streaming media service 408 may have no knowledge of the item of content being played back by streaming media client 402. In this case, content metadata assignor 416 may be able to nevertheless obtain metadata about the item of content by extracting it from an ad request that may be sent by streaming media client 402 to ad delivery system 418 during playback of the item of content by streaming media client 402.

For example, if the item of content being played back by streaming media client 402 is AVOD content, then streaming media client 402 may be configured to send ad requests to ad delivery system 418 during playback of the item of content and such ad requests may include descriptive information (e.g., genre) about the item of content. Content metadata assignor 416 may be configured to receive from log processor 414 information extracted from system logs 406 that indicates when a user has controlled streaming media client 402 to play back an item of content and the duration of such play back events. Content metadata assignor 416 may be further configured to use such system log information to determine which ad requests received by ad delivery system 418 from streaming media client 402 were received during playback of the item of content by streaming media client 402. In this way, content metadata assignor 416 may determine which ad requests were received from streaming media client 402 during playback of the item of content and may extract the descriptive information about the item of content from such ad requests. Content metadata assignor 416 may then provide such descriptive information to ad delivery system 418 so that ad delivery system 418 may utilize such information, along with the aforementioned context label received from streaming media client 402, to select one or more ads for delivery to streaming media client 402.

Log processor 414 may be further configured to utilize context labels generated by streaming media client 402 to update a device profile associated with streaming media device 402 and/or an account profile associated with streaming media device 402 or a user thereof, wherein such device and/or account profile may be stored in a device/account profiles data store 412. For example, log processor 414 may be configured to update such device profile or account profile to include a list of context labels generated by streaming media client 402, or other information that represents or may be derived from the context labels generated by streaming media client 402 (e.g., statistical data concerning moods, topics, themes, scenes, or other features or characteristics of content portions played back by streaming media client 402).

Content recommendation system 410 may be configured to generate and transmit personalized content recommendations to streaming media device 402 based on the device or account profile associated with streaming media device 402 stored in device/account profiles data store 412. Streaming media client 402 may be configured to present such personalized content recommendations to a user thereof. Content recommendation system 410 may represent content recommendation system 134 as previously described in reference to FIG. 1. However, content recommendation system 410 may generally represent any system that is configured to generate personalized content recommendations and deliver such recommendations to a streaming media client.

Thus, content recommendation system 410 may be configured to generate personalized content recommendations for streaming media client 402 based at least on the aforementioned context labels that are periodically or intermittently generated by streaming media client 402 or information derived therefrom. For example and without limitation, if one or more context labels generated by streaming media client 402 indicate that a user thereof has watched portions of content dealing having a particular feature or characteristic, then content recommendation system 410 may generate content recommendations for streaming media client 402 that identify items of content having a same, similar or complementary feature or characteristic.

Streaming media service 408 may also be configured to update one or more content streaming parameters used thereby to control the streaming of an item of content to streaming media client 402 based on context labels collected from streaming media client 402 by log processor 414. Such content streaming parameters may include a resolution, a bit rate, a frame rate, an encoding type, or any other parameter that can be used to control the generation or transmission of an A/V stream representing an item of content to be played back by streaming media client 402.

For example, while streaming media service 408 is streaming an item of content to streaming media client 402 in accordance with a first set of content streaming parameters, streaming media service 408 may receive one or more context labels from streaming media client 402 and, based on such context label(s), switch to a second set of content streaming parameters for streaming the item of content to streaming media client 402. This functionality may be used, for example, to ensure that a user of streaming media client 402 is presented with an uninterrupted viewing experience while viewing certain portions of the item of content. By way of further example, a context label generated by streaming media client 402 may indicate that a portion of a content item just played back by streaming media client 402 is related to a critical period of a sporting event (e.g., extra innings in a baseball playoff game, a penalty shoot-out at the end of a soccer game). In this case, streaming media service 408 may modify the content streaming parameters being used to stream the item of content to streaming media client 402 to, for example, favor ensuring uninterrupted playback over image quality Thus, for example, streaming media service 408 may reduce a resolution associated with the item of content to reduce a possibility of rebuffering or stalling during playback by streaming media client 402. However, this is only one example, and streaming media service 408 may modify other content streaming parameters to ensure uninterrupted viewing of the item of content during playback by streaming media client 402.

Figure 5:
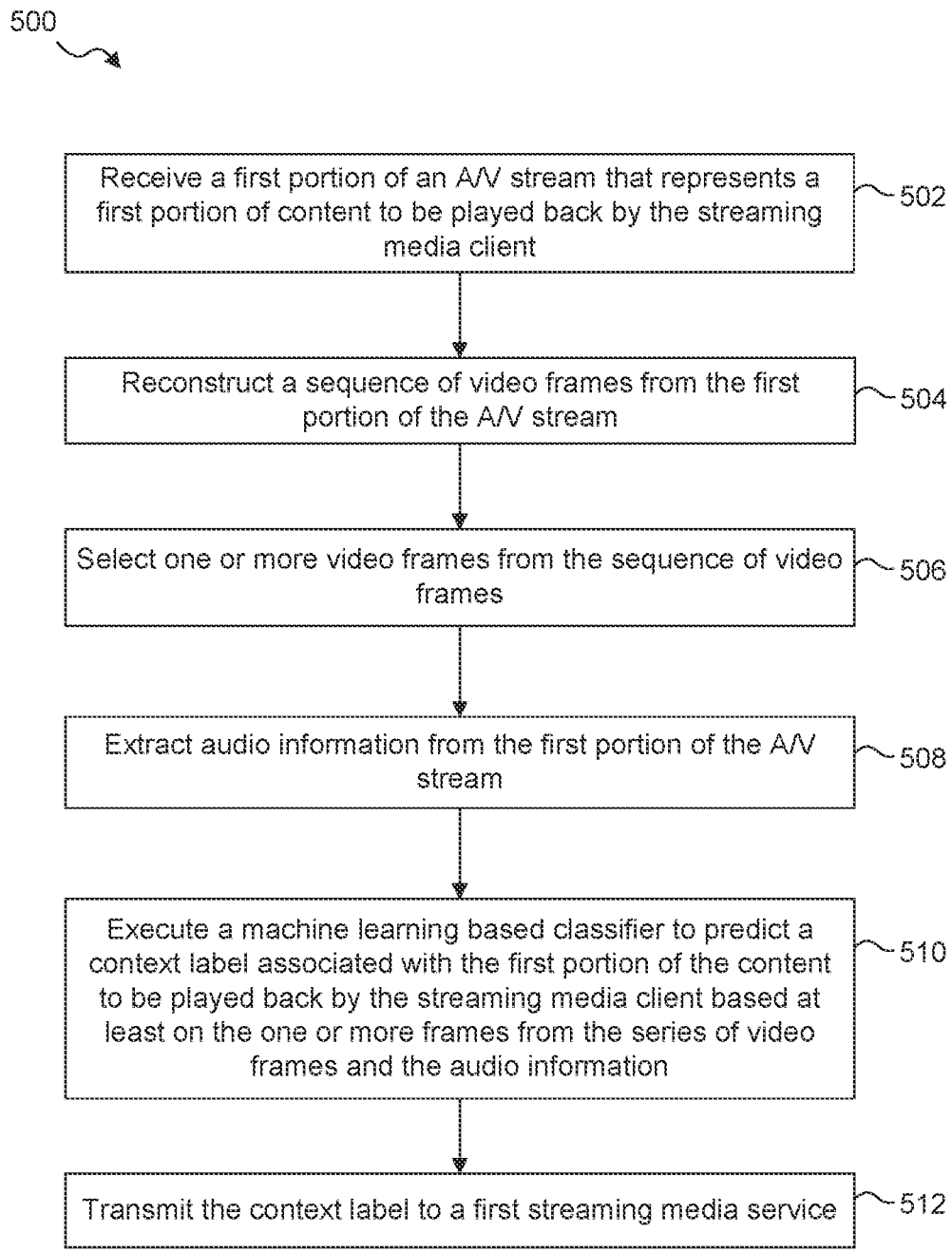
FIG. 5 illustrates a flow diagram of a method performed by a streaming media client for generating a context label associated with a portion of streaming content to be played back by the streaming media client, according to some embodiments.

FIG. 5 is a flow diagram for a method 500 performed by a streaming media client for generating a context label associated with a portion of content to be played back by the streaming media client, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to media device 106 of FIGS. 1-3, which is one example of a streaming media client, although method 500 is not limited to that embodiment.

In 502, streaming media context classification module 218 of media device 106 receives a first portion of an A/V stream 310 that represents a first portion of content to be played back by media device 106.

In 504, video frame reconstructor 302 of streaming media context classification module 218 reconstructs a sequence of video frames from the first portion of A/V stream 310.

In 506, video frame selector 304 of streaming media context classification module 218 selects one or more video frames from the sequence of video frames. For example, video frame selector 304 may select the one or more video frames from the sequence of video frames by applying a sampling technique. In further accordance with such an example, video frame selector 304 may select the one or more video frames by selecting video frames from the sequence of video frames that exhibit a predetermined degree of feature variance with respect to a preceding video frame in the sequence of video frames.

In 508, audio information extractor 306 extracts audio information from the first portion of A/V stream 310. For example, audio information extractor 306 may extract one or more of audio signals, subtitle information, or closed caption information from the first portion of A/V stream 310. Audio information extractor 306 may also extract the audio information from the first portion of A/V stream 310 by utilizing a language model, such as a Large Language Model, to generate a text summary of one or more of the aforementioned audio signals, subtitle information, or closed caption information, in which case the text summary may be considered the audio information extracted from the first portion of A/V stream 310.

In 510, streaming media context classification module 218 executes ML based context classifier 308 to predict a context label associated with the first portion of the content to be played back by media device 106 based at least on the one or more frames from the series of video frames and the audio information.

ML based context classifier 308 may predict the context label associated with the first portion of the content to be played back by media device 106 by selectively assigning a mood from among a plurality of moods to the first portion of the content. ML based context classifier 308 may alternatively predict the context label associated with the first portion of the content to be played back by media device 106 by selectively assigning a topic from among a plurality of topics to the first portion of the content.

Executing ML based context classifier 308 in 510 may comprise executing a multi-modal (e.g., visual and language) ML classification model to predict the context label associated with the first portion of the content based at least on the one or more video frames from the sequence of video frames and the audio information (e.g., a text representation of the audio information).

Executing ML based context classifier 308 in 510 may comprise executing a first (e.g. visual) ML classification model that generates a first context label prediction associated with the first portion of the content to be played back by media device 106 based on the one or more video frames from the sequence of video frames, executing a second (e.g., language) ML classification model that generates a second context label prediction associated with the first portion of the content to be played back by media device 106 based on the audio information (e.g., a text representation of the audio information), and predicting the context label associated with the first portion of the content to be played back by media device 106 based at least on the first context label prediction and the second context label prediction.

In 512, media device 106 transmits the context label to a first streaming media service (e.g., a streaming media service that includes system server(s) 126 and content server(s) 120 of FIG. 1, or streaming media service 408 of FIG. 4). As discussed above in relation to FIG. 4, media device 106 may store the context label in a system log that is local to media device 106 and then send the context label from the system log to the first streaming media service automatically or in response to a request from the first streaming media service.

Receiving the first portion of A/V stream 310 in 502 may entail receiving the first portion of A/V stream 310 from the first streaming media service to which the context label is transmitted in 512. However, 502 may alternatively entail receiving the first portion of A/V stream 310 from a second streaming media service (e.g., a third-party streaming media service) that is different than the first streaming media service to which the context label is transmitted in 512.

Method 500 may further include media device 106 obtaining metadata associated with the content being played back thereby from the first streaming media service. In this case, 510 may include executing ML based context classifier 308 to predict the context label associated with the first portion of content to be played back by media device 106 based at least on the one or more video frames from the sequence of video frames, the audio information, and the metadata. The metadata may comprise, for example, one of a content tag associated with the content and maintained by the first streaming media service, or information extracted by the first streaming media service from an advertisement request sent thereto by the media device 106 during streaming of the content.

Figure 6:
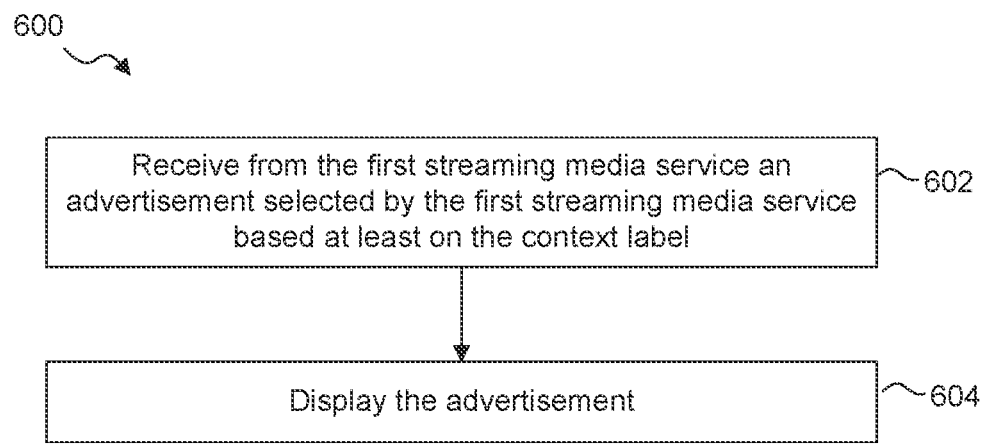
FIG. 6 illustrates a flow diagram of a method performed by a streaming media client for displaying an advertisement selected by a streaming media service based at least on a context label.

FIG. 6 is a flow diagram for a method 600 performed by a streaming media client for displaying an advertisement selected by a streaming media service based at least on a context label, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to multimedia environment 102 of FIGS. 1-2 and streaming media system 400 of FIG. 4, although method 600 is not limited to those embodiments.

In 602, the streaming media client (e.g., media device 106 or streaming media client 402) receives from the first streaming media service (e.g., ad delivery system 128 of system server(s) 126 or ad delivery system 418 of streaming media service 408) an advertisement selected by the first streaming media service based at least on a context label generated by and collected from the streaming media client (e.g., the context label sent to the first streaming media service in 512 of method 500), In 604, the streaming media client displays the advertisement, for example, to a user thereof. For example, media device 106 may render the advertisement to display device 108 so that user 132 may view it. Streaming media client 402 may likewise display the advertisement to a suitable display device to be viewed by a user thereof.

Figure 7:
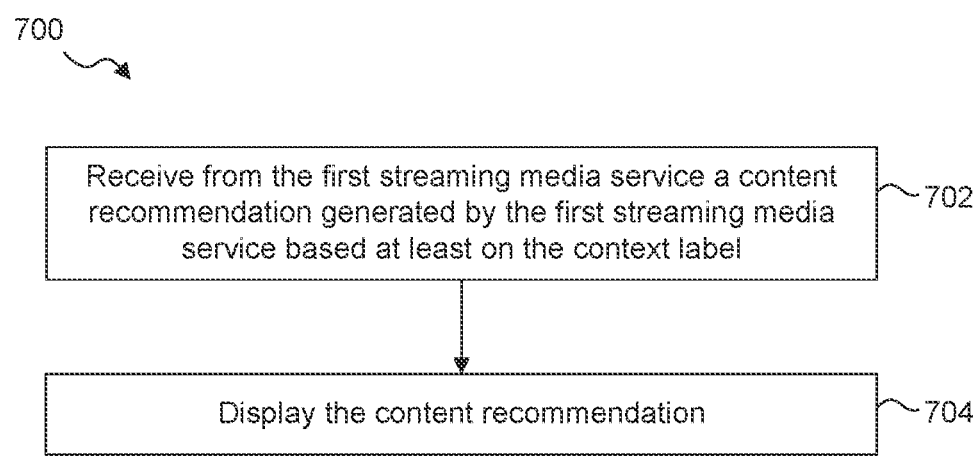
FIG. 7 illustrates a flow diagram of a method performed by a streaming media client for displaying a content recommendation generated by a streaming media service based at least on a context label.

FIG. 7 is a flow diagram for a method 700 performed by a streaming media client for displaying a content recommendation generated by a streaming media service based at least on a context label, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to multimedia environment 102 of FIGS. 1-2 and streaming media system 400 of FIG. 4, although method 700 is not limited to those embodiments.

In 702, the streaming media client (e.g., media device 106 or streaming media client 402) receives from the first streaming media service (e.g., content recommendation system 134 of system server(s) 126 or content recommendation system 410 of streaming media service 408) a content recommendation generated by the first streaming media service based at least on a context label generated by and collected from the streaming media client (e.g., the context label sent to the first streaming media service in 512 of method 500).

In 704, the streaming media client displays the content recommendation, for example, to a user thereof. For example, media device 106 may render the content recommendation to display device 108 so that user 132 may view it. Streaming media client 402 may likewise display the content recommendation to a suitable display device to be viewed by a user thereof.

Figure 8:
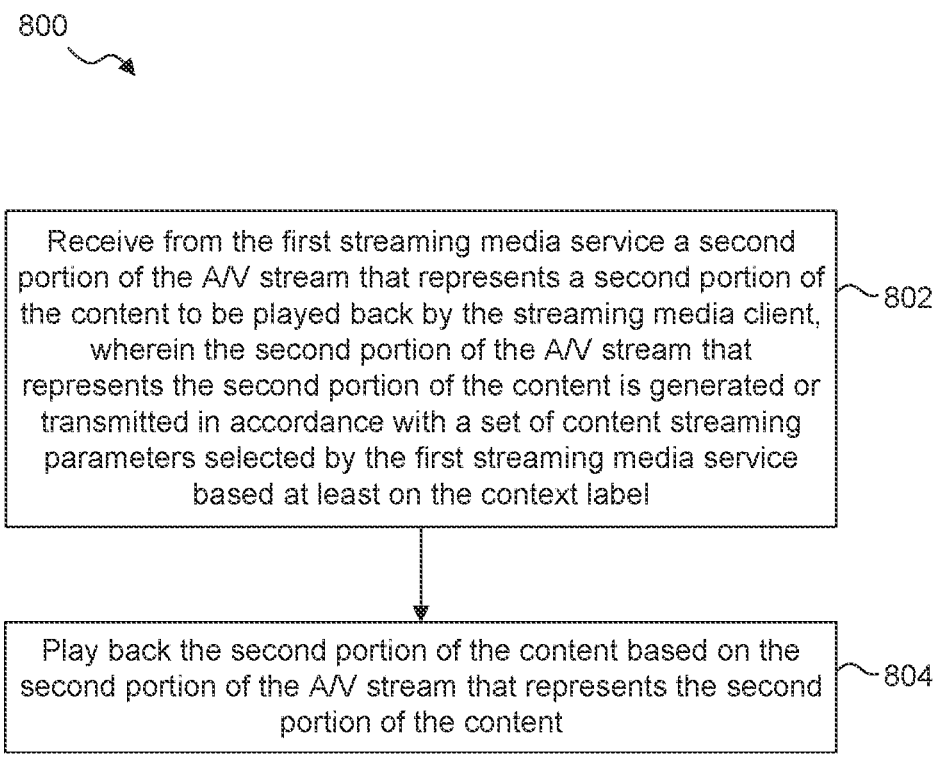
FIG. 8 illustrates a flow diagram of a method performed by a streaming media client for playing back a portion of content based on a portion of an A/V stream generated or transmitted in accordance with a set of content streaming parameters selected by a streaming media service based at least on a context label.

FIG. 8 is a flow diagram for a method 800 performed by a streaming media client for playing back a portion of content based on a portion of an A/V stream generated or transmitted in accordance with a set of content streaming parameters selected by a streaming media service based on a context label, according to some embodiments. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art.

Method 800 shall be described with reference to multimedia environment 102 of FIGS. 1-2 and streaming media system 400 of FIG. 4, although method 800 is not limited to those embodiments.

Prior to 802, it is to be assumed that method 500 of FIG. 5 has been performed by the streaming media client (e.g., media device 106 or streaming media client 402) and that 502 entails receiving from the first streaming media service (e.g., system server(s) 126 and content server(s) 120 or streaming media service 408) the first portion of A/V stream 310 that represents the first portion of the content to be played back by the streaming media client.

In 802, the streaming media client receives, from the first streaming media service, a second portion of A/V stream 310 that represents a second portion of the content to be played back by the streaming media client. The second portion of A/V stream 310 is generated or transmitted in accordance with a set of content streaming parameters selected by the first streaming media service based at least on the context label transmitted to the first streaming media service in 512. For example, the context label may indicate that a portion of a content item just played back by the streaming media client is a relatively important portion of the content item. In this case, streaming media service 408 may select a set of content streaming parameters that favor ensuring uninterrupted playback over image quality (e.g., a reduced resolution) and then generates or transmits the second portion of A/V stream 310 in accordance with such parameters.

In 804, the streaming media client plays back the second portion of the content based on the second portion of A/V stream 310. For example, media device 106 may play back the second portion of the content based on the second portion of A/V stream 310 via display device 108 so that user 132 may view it. Streaming media client 402 may likewise play back the second portion of the content based on the second portion of A/V stream 310 via a suitable display device so that a user thereof may view it.

Example Computer System

Various embodiments may be implemented, for example, using one or more well-known computer systems, such as computer system 900 shown in FIG. 9. For example, one or more of media device 106, remote control 110, content server(s) 120, system server(s) 126, ad delivery system 128, content recommendation system 134, streaming media context classification module 218, streaming media client 402, or streaming media service 408 may be implemented using combinations or sub-combinations of computer system 900. Also or alternatively, one or more computer systems 900 may be used, for example, to implement any of the embodiments discussed herein, as well as combinations and sub-combinations thereof.

Computer system 900 may include one or more processors (also called central processing units, or CPUs), such as a processor 904. Processor 904 may be connected to a communication infrastructure or bus 906.

Computer system 900 may also include user input/output device(s) 903, such as monitors, keyboards, pointing devices, etc., which may communicate with communication infrastructure 906 through user input/output interface(s) 902.

One or more of processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache. Main memory 908 may have stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 900 may further include a communication or network interface 924. Communication interface 924 may enable computer system 900 to communicate and interact with any combination of external devices, external networks, external entities, etc. (individually and collectively referenced by reference number 928). For example, communication interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 822, as well as tangible articles of manufacture embodying any combination of the foregoing. Such control logic, when executed by one or more data processing devices (such as computer system 900 or processor(s) 904), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method performed by a streaming media client, comprising:
- receiving, by at least one computer processor of the streaming media client, a first portion of an audio/video (A/V) stream that represents a first portion of content to be played back by the streaming media client;
- reconstructing a sequence of video frames from the first portion of the A/V stream;
- identifying one or more video frames from the sequence of video frames based on a predetermined degree of feature variance with respect to a preceding video frame in the sequence of video frames;
- extracting audio information from the first portion of the A/V stream;
- executing a machine learning (ML) based classifier to predict a context label associated with the first portion of the content to be played back by the streaming media client based at least on the one or more video frames from the sequence of video frames and the audio information; and
- transmitting the context label to a first streaming media service.

2. The method of claim 1, further comprising:
- receiving, from the first streaming media service, an advertisement selected by the first streaming media service based at least on the context label; and
- displaying the advertisement.

3. The method of claim 1, further comprising:
- receiving, from the first streaming media service, a content recommendation generated by the first streaming media service based at least on the context label; and
- displaying the content recommendation.

4. The method of claim 1, wherein receiving the first portion of the A/V stream that represents the first portion of the content to be played back by the streaming media client comprises receiving, from the first streaming media service, the first portion of the A/V stream that represents the first portion of the content to be played back by the streaming media client, and wherein the method further comprises:
- receiving, from the first streaming media service, a second portion of the A/V stream that represents a second portion of the content to be played back by the streaming media client, wherein the second portion of the A/V stream that represents the second portion of the content to be played back by the streaming media client is generated or transmitted in accordance with a set of content streaming parameters selected by the first streaming media service based at least on the context label; and
- playing back the second portion of the content based on the second portion of the A/V stream that represents the second portion of the content.

5. The method of claim 1, wherein predicting the context label associated with the first portion of the content comprises:
- selectively assigning a mood from among a plurality of moods to the first portion of the content; or
- selectively assigning a topic from among a plurality of topics to the first portion of the content.

6. The method of claim 1, further comprising:
- selecting the one or more video frames from the sequence of video frames by applying a sampling technique.

7. The method of claim 1, wherein extracting the audio information from the first portion of the A/V stream comprises extracting, from the first portion of the A/V stream, one or more of:
- audio signals;
- subtitle information; or
- closed caption information.

8. The method of claim 1, further comprising:
- obtaining metadata associated with the content from the first streaming media service;
- wherein executing the ML based classifier to predict the context label associated with the first portion of the content to be played back by the streaming media client based at least on the one or more video frames from the sequence of video frames and the audio information comprises:
  - executing the ML based classifier to predict the context label associated with the first portion of content to be played back by the streaming media client based at least on the one or more video frames from the sequence of video frames, the audio information, and the metadata.

9. A streaming media client, comprising:
- one or more memories; and
- at least one processor each coupled to at least one of the memories and configured to perform operations comprising:
  - receiving a first portion of an audio/video (A/V) stream that represents a first portion of content to be played back by the streaming media client;
  - reconstructing a sequence of video frames from the first portion of the A/V stream;
  - identifying one or more video frames from the sequence of video frames based on a predetermined degree of feature variance with respect to a preceding video frame in the sequence of video frames;
  - extracting audio information from the first portion of the A/V stream;
  - executing a machine learning (ML) based classifier to predict a context label associated with the first portion of the content to be played back by the streaming media client based at least on the one or more video frames from the sequence of video frames and the audio information; and
  - transmitting the context label to a first streaming media service.

10. The streaming media client of claim 9, wherein the operations further comprise:
- receiving, from the first streaming media service, an advertisement selected by the first streaming media service based at least on the context label; and
- displaying the advertisement.

11. The streaming media client of claim 9, wherein the operations further comprise:
- receiving, from the first streaming media service, a content recommendation generated by the first streaming media service based at least on the context label; and
- displaying the content recommendation.

12. The streaming media client of claim 9, wherein receiving the first portion of the A/V stream that represents the first portion of the content to be played back by the streaming media client comprises receiving, from the first streaming media service, the first portion of the A/V stream that represents the first portion of the content to be played back by the streaming media client, and wherein the operations further comprise:
- receiving, from the first streaming media service, a second portion of the A/V stream that represents a second portion of the content to be played back by the streaming media client, wherein the second portion of the A/V stream that represents the second portion of the content to be played back by the streaming media client is generated or transmitted in accordance with a set of content streaming parameters selected by the first streaming media service based at least on the context label; and playing back the second portion of the content based on the second portion of the A/V stream that represents the second portion of the content.

13. The streaming media client of claim 9, wherein predicting the context label associated with the first portion of the content comprises:

selectively assigning a mood from among a plurality of moods to the first portion of the content; or selectively assigning a topic from among a plurality of topics to the first portion of the content.

14. The streaming media client of claim 9, wherein the operations further comprise:

selecting the one or more video frames from the sequence of video frames by applying a sampling technique.

15. The streaming media client of claim 9, wherein extracting the audio information from the first portion of the A/V stream comprises extracting, from the first portion of the A/V stream, one or more of:

audio signals;
subtitle information; or
closed caption information.

16. The streaming media client of claim 9, wherein the operations further comprise:

obtaining metadata associated with the content from the first streaming media service;

wherein executing the ML based classifier to predict the context label associated with the first portion of the content to be played back by the streaming media client based at least on the one or more video frames from the sequence of video frames and the audio information comprises:

executing the ML based classifier to predict the context label associated with the first portion of content to be played back by the streaming media client based at least on the one or more video frames from the sequence of video frames, the audio information, and the metadata.

17. A non-transitory computer-readable medium having instructions stored thereon that, when executed by at least one computer processor of a streaming media client, cause the at least one computer processor to perform operations, the operations comprising:

receiving a first portion of an audio/video (A/V) stream that represents a first portion of content to be played back by the streaming media client;

reconstructing a sequence of video frames from the first portion of the A/V stream;

identifying one or more video frames from the sequence of video frames based on a predetermined degree of feature variance with respect to a preceding video frame in the sequence of video frames;

extracting audio information from the first portion of the A/V stream;

executing a machine learning (ML) based classifier to predict a context label associated with the first portion of the content to be played back by the streaming media client based at least on the one or more video frames from the sequence of video frames and the audio information; and transmitting the context label to a first streaming media service.

18. The non-transitory computer-readable medium of claim 17, wherein the operations further comprise:

receiving, from the first streaming media service, an advertisement selected by the first streaming media service based at least on the context label; and displaying the advertisement.

19. The non-transitory computer-readable medium of claim 17, wherein the operations further comprise:

receiving, from the first streaming media service, a content recommendation generated by the first streaming media service based at least on the context label; and displaying the content recommendation.

20. The non-transitory computer-readable medium of claim 17, wherein receiving the first portion of the A/V stream that represents the first portion of the content to be played back by the streaming media client comprises receiving, from the first streaming media service, the first portion of the A/V stream that represents the first portion of the content to be played back by the streaming media client, and wherein the operations further comprise:

receiving, from the first streaming media service, a second portion of the A/V stream that represents a second portion of the content to be played back by the streaming media client, wherein the second portion of the A/V stream that represents the second portion of the content to be played back by the streaming media client is generated or transmitted in accordance with a set of content streaming parameters selected by the first streaming media service based at least on the context label; and playing back the second portion of the content based on the second portion of the A/V stream that represents the second portion of the content.

* * * * *